United States Patent [19]
Hashizume

[11] Patent Number: 5,936,263
[45] Date of Patent: Aug. 10, 1999

[54] WEAR-RESISTANT OPTICAL COUPLING MODULE

[75] Inventor: Hideki Hashizume, Osaka, Japan

[73] Assignees: Nippon Sheet Glass Co., Ltd., Osaka, Japan; Nippatsu Hanbai Kabushiki Kaisha, Tokyo, Japan

[21] Appl. No.: 08/930,414

[22] PCT Filed: Jan. 31, 1997

[86] PCT No.: PCT/JP97/00231
§ 371 Date: Sep. 29, 1997
§ 102(e) Date: Sep. 29, 1997

[87] PCT Pub. No.: WO97/28478
PCT Pub. Date: Jul. 8, 1997

[30] Foreign Application Priority Data

Jan. 31, 1996 [JP] Japan .................................. 8-037461

[51] Int. Cl.⁶ ...................... H01L 33/00; H01L 31/0232; H01L 31/0203
[52] U.S. Cl. .............................. 257/98; 257/99; 257/432; 257/433; 385/92
[58] Field of Search .............................. 257/98, 99, 432, 257/433; 385/92, 93, 88

[56] References Cited

FOREIGN PATENT DOCUMENTS 3-107807  5/1991  Japan .
3-259106  11/1991 Japan .
8-211255  8/1996  Japan .

*Primary Examiner*—Minh Loan Tran
*Attorney, Agent, or Firm*—Ratner & Prestia

[57] ABSTRACT

An optical module having a simple construction and excellent wear resistance that can be manufactured at low cost and high accuracy, and a method of manufacturing the same. The optical module has such a construction that an optical semiconductor element (10), a holder (14) for holding it, and a receptacle core (16) for holding a ferrule of an optical plug being connected in a fixedly fitted manner are provided, so that the optical semiconductor element is optically coupled with an optical fiber in the ferrule when connecting the optical plug. The receptacle core is an integrally formed metallic tubular piece having a high hardness film (16*a*) of TiC formed at least on the inner circumferential surface of the bore thereof, and a ferrule stopper (18) is provided at the proximal end of the bore. The holder and the receptacle core may be of an integrally formed construction. The high hardness film is formed into a thickness of 1–10 μm with the CVD process.

8 Claims, 4 Drawing Sheets

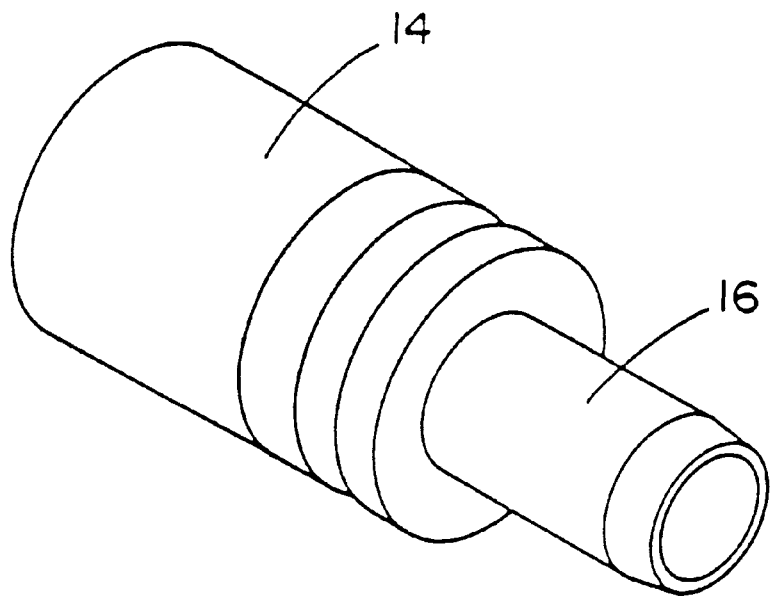
F I G. 2
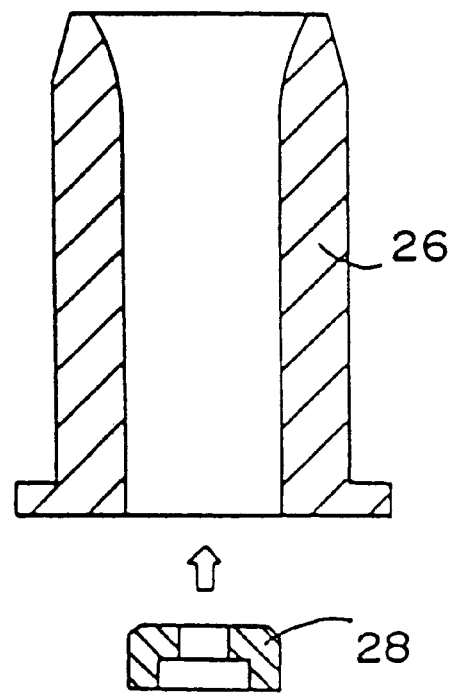
F I G. 3

5,936,263

WEAR-RESISTANT OPTICAL COUPLING MODULE

This application is a U.S. National Phase Application of PCT International Application PCT/JP97/00231.

TECHNICAL FIELD

The present invention relates generally to an optical module and a method of manufacturing the same, and more specifically to an optical module having a receptacle formed as an integrally formed metallic tubular piece, into which a ferrule of an optical plug being connected is inserted, a high hardness film of TiC having a hardness of 2800–3500 Hv (Vickers hardness) formed at least on the inner circumferential surface of the bore of the receptacle, and a method of manufacturing the same. This technology is useful as a light emitting or receiving device used in an optical LAN, for example.

BACKGROUND ART

An optical module is an optical component for optically coupling a semiconductor light-emitting element or semiconductor light-receiving element to an optical fiber. It is being widely used in optical communications and many other fields. In a computer system used for data communications, for example, a semiconductor light-emitting element module and a semiconductor light-receiving element module are mounted as a pair on a board. Optical modules of this type usually comprises an optical semiconductor element (a semiconductor light-emitting element such as a laser diode, or a semiconductor light-receiving element such as a photodiode, for example), a holder for holding the optical semiconductor element, and a receptacle core fixed to the holder for holding a ferrule of an optical plug being connected in a fixedly fitted manner, the optical semiconductor element being optically connected with the optical fiber in the ferrule when the optical plug is connected to the optical module.

The ferrule of the optical plug is a member for holding an end of the optical fiber along the central axis thereof. It is made of stainless steel in some cases, but more commonly made of a ceramic material such as zirconia, due to durability and reliability. The receptacle core, on the other hand, is required to have even better wear resistance since it is a member into and from which the ferrule is frequently inserted or detached when connecting and disconnecting the optical plug, and because the optical module is a component which is mounted on a board. In the prior art, therefore, a construction has often been adopted in which a ceramic sleeve made of a ceramic material such as zirconia, is press-fitted or adhered to the inner circumferential surface of a tubular core housing.

When a ceramic sleeve made of zirconia, which has a relatively high hardness and good wear resistance, is used as the receptacle core of an optical module, these ceramic components have to be machined into precise dimensions and press-fitted to a core housing. Thus, the ceramic sleeve tends to be extremely expensive. A construction in which a split sleeve made of phosphor bronze is inserted into the core housing may be adopted to achieve low-cost manufacture. Metallic sleeves, however, generally have poor wear resistance, compared with ceramic sleeves, and lack reliability and durability because they are apt to wear compared with ceramic ferrules. Furthermore, repeated attaching and detaching may cause the problem of changes in the amount of light coupled between the optical semiconductor element and the optical fiber.

As a method for solving this problem, an optical connector receptacle has been proposed in which the contact surface (the inner circumferential surface of the bore) of the receptacle core with which the ferrule makes contact is covered with a material having such a low friction coefficient that the dynamic friction coefficient thereof with the ferrule becomes less than 0.7 (Japanese Patent Publication No. 3-107807). In the disclosure, materials selected from a group consisting of TiN, zirconia, alumina, polytetrafluoroethylene, fluorine resin and $MOS_2$, or a composite material containing such materials are cited as examples of coating materials having low friction coefficient. This technique is based on the concept that the use of a receptacle core whose contact surface with the ferrule has a low friction coefficient makes the insertion of the ferrule easy, resulting in reduced wear. The materials cited therefore include those having considerably low hardness values.

If a material having a low friction coefficient and also a low hardness, such as fluorine resin or $MoS_2$, is used, however, the inner circumferential surface of the bore may be damaged as a ferrule having a relatively high hardness is inserted. Although TiN has a relatively high hardness, it is inferior to TiC by way of comparison based on the requirement that the material of the contact surface with the ferrule should has a low friction coefficient and a high hardness. Note that a TiN sintered bulk material has a Vickers hardness of 1900–2800 Hv and a friction coefficient of $0.49\mu$, while TiC has a Vickers hardness of 3000–4000 Hv and a friction coefficient of $0.25\mu$.

As described above, the receptacle is hard to be removed because it is permanently fitted to equipment, whereas the ferrule can be easily replaced since it is detachably connected to an optical fiber. Needless to say, both of the receptacle and the ferrule are desired to be subjected to less wear, but in terms of maintenance as the entire system, the receptacle should preferably be harder than the ferrule. In this respect, it is not desirable to cover the bore inner circumferential surface of the receptacle with a film having a low hardness for the above-mentioned reason.

Requirements for the receptacle include high accuracy in the manufacture of the bore inner circumferential surface, in addition to high resistance to wear. When forming a film, it is important to choose a material and a film-forming method to ensure controllability of film thickness and a consistent film thickness over a wide range. This is because the changes in inside diameter caused by uneven and consistent film thickness may greatly affect optical transmission efficiency.

DISCLOSURE OF THE INVENTION

It is an object of the present invention to provide an optical module having such a construction that the above-mentioned problems associated with the prior art can be solved and an optical module having a simple construction and good wear resistance can be manufactured at low cost and with high accuracy.

It is another object of the present invention to provide a method for manufacturing an optical module having the aforementioned construction.

The present invention relates to an optical module for optically coupling an optical semiconductor element to an optical fiber in a ferrule when connecting an optical plug, the optical module comprising an optical semiconductor element, a holder for holding the optical semiconductor element, and a receptacle core fixed to the holder for holding the ferrule of an optical plug being connected in a fixedly fitted manner. The receptacle core used in the present invention is an integrally formed metallic component having a high hardness film of TiC formed at least on the inner circumferential surface of the bore thereof, and of such a construction that a ferrule stopper is provided on the proximal end of the bore. This construction is a type in which the holder and the receptacle core as separate components are fixed to each other, but both components may be formed integrally. The high hardness film of TiC should be formed with a CVD (chemical vapor-phase deposition) process into a thickness of approximately 1–10 μm. Although a film material tends to have slightly lower hardness than a sintered bulk material made of the same material, a CVD film of TiC has a Vickers hardness of 2800–3600 Hv.

To manufacture the receptacle core used in such an optical module, an integrally formed piece formed by machining or injection molding a heat-resistant stainless steel product is used, and a high hardness film of TiC having a thickness of 1–10 μm is formed with the CVD process at least on the inner circumferential surface of the bore thereof. After film formation, a ferrule stopper is press-fitted to the proximal end of the bore without polishing the inner circumferential surface thereof.

Even with a metallic receptacle core, a high hardness film of 2800–3500 Hv formed on the circumferential surface of the bore effectively prevents the receptacle core from wearing out even if the ferrule slides in the receptacle core during the attaching and detaching of the optical plug. Thus, even when the optical plug is repeatedly attached and detached, the amount of light coupled between the optical semiconductor element and the optical fiber hardly lowers, with the result that a durability equivalent to that with a zirconia ceramic sleeve can be accomplished. Use of the CVD process to form a high hardness film ensures a practically uniform film over the inner circumferential surface of the bore even the tubular member is a long-sized one. Batch processing of receptacle cores stacked in multiple stages in a reactor (film-forming vessel) promises extremely efficient and low-cost manufacture. The CVD process where film-forming speed can be reduced compared with the formation of TiN films helps to form densified TiC films. In addition, easy control of film thickness with the CVD process results in uniform films with high dimensional accuracy.

BRIEF DESCRIPTION OF THE DRAWINGS

FIG. 2 is a perspective view of the optical module body.

FIG. 3 is a cross-sectional view of an example of a receptacle core used in the present invention.

BEST MODE FOR CARRYING OUT THE INVENTION

Although a high hardness film formed on the receptacle core may be sufficient to cover only a portion where the receptacle core comes in sliding contact with the optical plug, it may of course cover the entire outer surface of the receptacle core. With such a construction that the high hardness film covers the entire outer surface, the need for masking portions other than the inner circumferential surface can be eliminated, making the manufacture easier. A lens incorporated inside the optical module may be a rod lens or a spherical lens, or even a construction in which no lens is incorporated may be adopted, depending on specification requirements. When a semiconductor light-receiving element like a photodiode is incorporated, instead of a semiconductor light-emitting element such as a laser diode, a light-receiving device for optical LANs can be formed. The receptacle core and the holder are generally manufactured separately for later assembly, whereas an integrally formed holder including the receptacle may be used, especially in a construction in which no lens is incorporated. Furthermore, a combination of the laser holder for holding a laser diode and a lens holder for holding a lens may be adopted.

Figure 1:
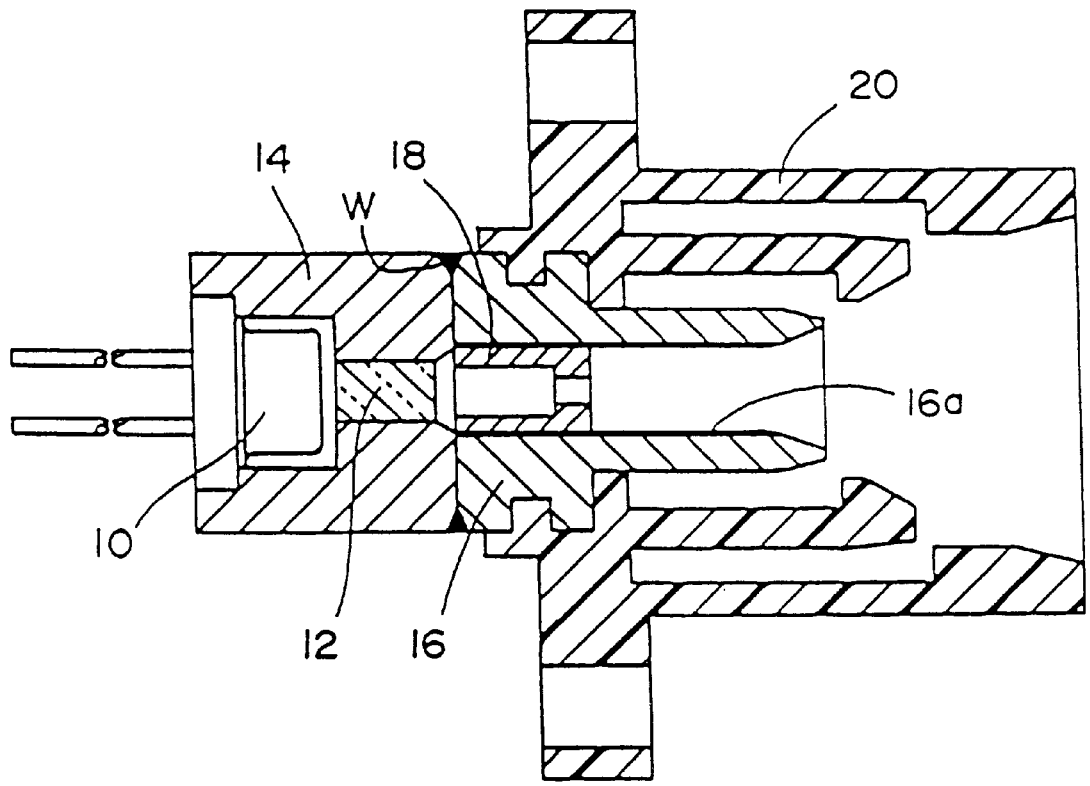
FIG. 1 is a cross-sectional view of an optical module according to the present invention.

FIG. 1 is a cross-sectional view of an optical module according to the present invention, and FIG. 2 is a perspective view of the optical module body. The figures show an example of a light source for optical LANs where a laser diode is used as the optical semiconductor element. The optical module comprises a laser diode 10, a holder 14 for holding a laser diode 10 and a lens 12, and a receptacle core 16 into which a ferrule (not shown) of an optical plug being connected is inserted.

The receptacle core 16 is an integrally formed tubular piece made of stainless steel (SUS304, for example), at least on the inner circumferential surface of whose bore formed is a high hardness film 16a, a CVD-formed TiC film, of a thickness of approximately 1–10 μm. A ferrule stopper 18 is provided on the proximal end of the bore of the receptacle core 16.

The receptacle core 16 of such a construction is fixed to the holder 14 by YAG welding (welds are indicated by symbol W in the Figure) in a concentrically aligned state. This is the optical module body shown in FIG. 2. A plastic connector housing 20 is provided on the outer circumferential surface of the optical module body.

Figure 1A:
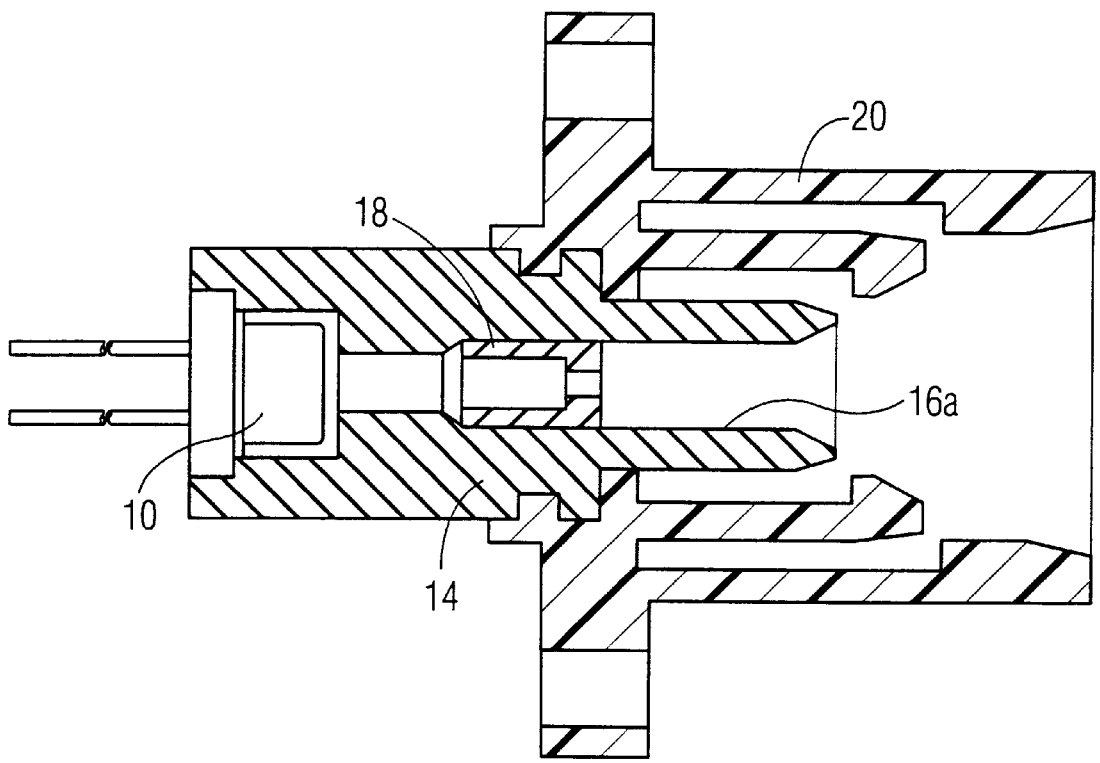
FIG. 1A is a cross-sectional view of an optical module having an integrally formed holder and receptacle core according to the present invention.

FIG. 1A shows an alternative embodiment in which the receptacle core is formed as an integral part of the holder 14.

When an optical plug is connected to the optical module, the ferrule of the optical plug is inserted into the bore of the receptacle core 16, and the plug frame of the optical plug is engaged with the connector housing 20 to complete mechanical coupling. In this state, optical alignment and coupling are simultaneously accomplished so that the light emitted from the laser diode 10 is focused with the lens 12 on the optical fiber in the ferrule.

Even with the optical plug ferrule made of a ceramic material such as zirconia, practically no wear is caused after repeated attaching and detaching because the bore inner circumferential surface of the receptacle core 16 is completely covered with a high hardness film 16a of TiC. Now, the present invention will be explained with specific numerical values. When a high hardness film of TiC is formed, the hardness of the bore inside surface is 2800–3500 Hv (Vickers hardness), a much higher value than the hardness (approx. 1500 Hv) of zirconia that is the material of the optical plug ferrule. Thus, the wear resistance of the receptacle core is dramatically improved. The Vickers hardness of a stainless steel receptacle core having no high hardness film is as low as about 300–500 Hv.

Now, the manufacturing method of the optical module (more specifically the receptacle core) according to the present invention will be described in the following, referring to FIGS. 3 through 5. FIG. 3 is a cross-sectional view of a receptacle core and a ferrule stopper used in the trial production of the optical module according to the present invention. A practically cylindrical receptacle core 26 of an inside diameter of about 2.5 mm and an outside diameter of 4.65 mm was manufactured by machining a stainless steel product (SUS304) with an NC machine tool. A taper having a smooth curved surface with a radius of curvature of approx. 2 mm was provided on the side of the receptacle core 26 into which the ferrule is inserted to facilitate the attaching and detaching of the optical plug. Around the proximal end (bottom) of the receptacle core 26 provided was an about 1 mm wide flange to which the holder is welded.

Figure 4:
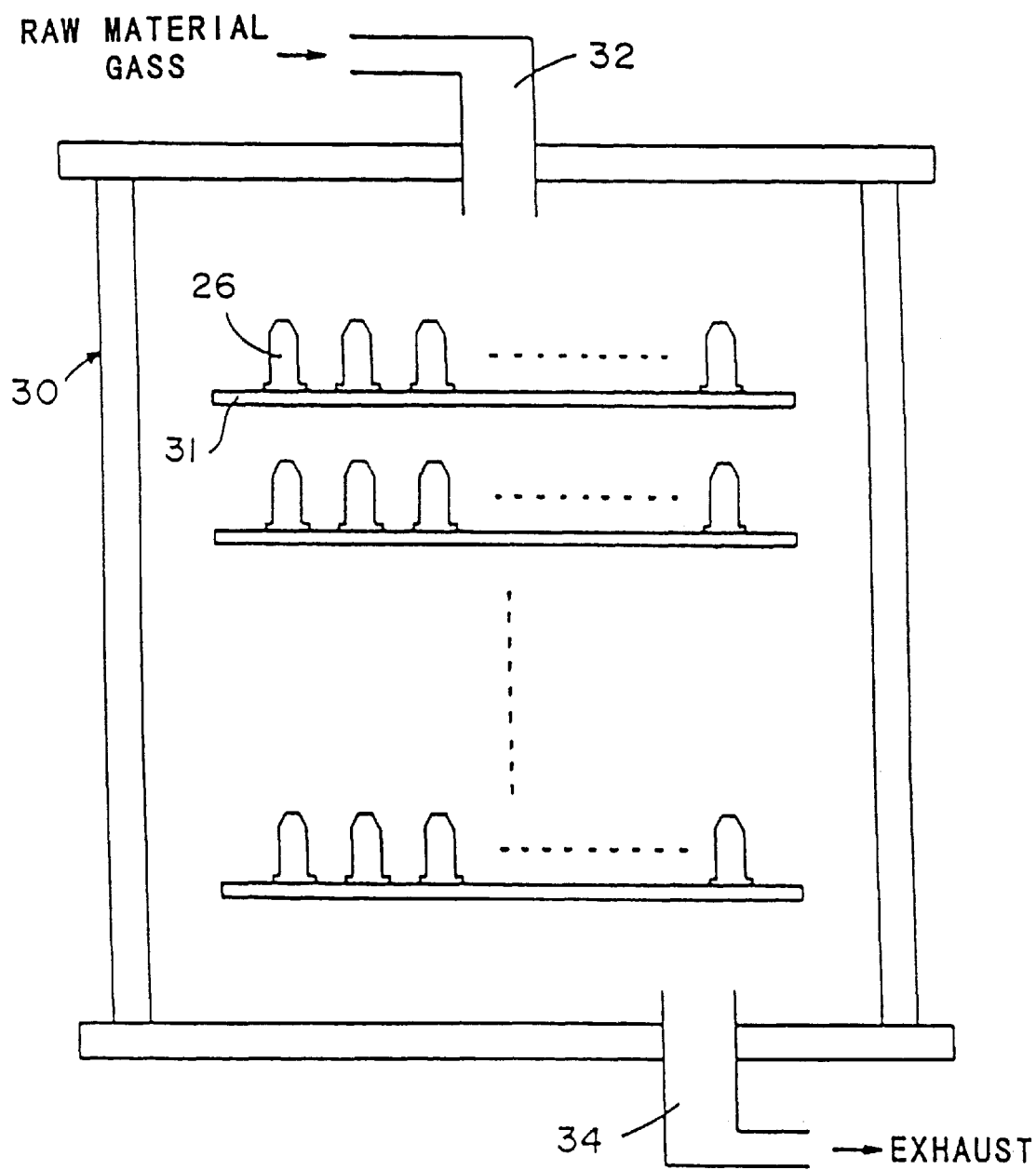
FIG. 4 is a diagram of assistance in explaining the manufacturing method of the receptacle core of an optical module according to the present invention.

The integrally formed cylindrical receptacle core 26 machined in the above-mentioned manner was placed in a reactor 30 shown in FIG. 4. A few stages of shelf plates 31 formed by fabricating very fine metallic wires into netting were installed in the reactor 30, on which the receptacle cores were arranged, with the flanged bottom thereof down. About 2000 pieces of the receptacle cores were placed in the reactor 30 and treated in a single batch. The inside of the reactor 30 was decompressed by a vacuum pump via an exhaust pipe 34, while raw material gas was fed from a gas feed pipe 32. As raw material gas, reactive gas (vapor-phase metal salt, hydrocarbon) and inert gas (argon or nitrogen) is used if necessary.

In this instance, titanium tetrachloride and methane were used as reactive gases. To carry out film formation with a thermal CVD process, the temperature inside the reactor 30 was controlled at 1000° C. TiC films were formed in a reaction given below.

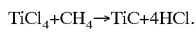

$$TiCl_4 + CH_4 \rightarrow TiC + 4HCl.$$

It took about 3 hours to form a film of a required thickness. The receptacle core was made of stainless steel to prevent changes in properties when heated to 1000° C. A reaction takes place on the surface of the heated receptacle core, and TiC as a reaction product is deposited into a film. Thus, a film of a uniform thickness can be formed on the inner surface of a tubular material that is a long-sized one.

Although the bore of the receptacle core was about 2.5 mm in diameter and about 8 mm in length, a TiC film of about 2 μm in thickness can be formed uniformly with the aforementioned process. The results of SEM measurement of the cross section after film formation revealed that the thickness of the film formed was 2.3 μm on the outer surface of the receptacle core, and 2.1 μm on the inner surface, indicating that the film formed had less anisotropy. The hardness of the film on the bore inner surface with which the optical plug ferrule comes in contact was in the range of 2800–3500 Hv in Vickers hardness. Although the inside surface was not polished for economic reasons, the surface roughness was less than 1.6 μm based on the 10-point mean surface roughness measurement. The TiC film formed with the CVD process, which has about 1 μm grain boundaries on its surface, makes point contact with the ferrule at multiple points, rather than surface contact. This reduces the friction of the receptacle core to a practical degree though the dynamic friction coefficient between the film and the ferrule is not so low.

A ferrule stopper 28 made of stainless steel (SUS303, for example) manufactured in a separate process is press-fitted from the bottom to the receptacle core on which a high hardness film has been formed with the aforementioned process (see FIG. 3) to complete the receptacle. The ferrule stopper is fitted to the receptacle core after the film has been formed because installing the ferrule stopper in advance of film formation would prevent raw material gas from flowing during film formation, making it difficult to achieve a film of a uniform thickness.

The lens is fixed to the holder using low-melting glass. The optical semiconductor element (laser diode) is fixed to the holder by YAG laser welding, both of the lens and the optical semiconductor element being not aligned in the direction of optical axis at this stage because their mounting positions are determined by the machining dimensions of the holder. After that, the holder and the receptacle core are brought closer to each other, the optical plug ferrule is inserted into the receptacle core while precision aligning both component in the direction of the mated surface while monitoring the amount of output light from the optical fiber, and both components are spot welded by radiating a YAG laser beam at the peak coupling position. In this way, the optical module can be assembled.

After the optical plug having a ceramic ferrule made of zirconia was attached and detached 2000 times to and from the optical module thus manufactured, the 20-point mean value of the amount of radiant light was reduced only by 0.07 dB from the start point to the end point. The maximum deviation of each output data from the start point was only 0.21 dB, quite comparable to a receptacle core having an expensive zirconia sleeve.

Industrial Applicability

Since the present invention provides a receptacle core that is hard to wear out even when a ceramic ferrule of an optical plug comes in sliding contact with the receptacle core since the receptacle core is made of an integrally formed metallic tubular piece at least on the inner circumferential surface of whose bore a high hardness film of TiC having a higher Vickers hardness and a lower friction coefficient than TiN is formed, the receptacle core is subjected to less wear even when the ceramic ferrule of the optical plug makes sliding contact with the receptacle core. That is, changes in the amount of coupled light between the optical semiconductor element and the optical fiber can be reduced to an extremely low level because the inside diameter of the bore can be prevented from expanding even after the repeated attaching and detaching of the optical plug. Since a large number of high hardness films can be formed in a single operation with the CVD process, the high hardness films can be manufactured with great production efficiency and at low cost. Furthermore, products of a uniform film thickness and high dimensional accuracy can be manufactured with high yield.

In addition, the inner circumferential surface of the receptacle core after film formation need not be polished because friction between the high hardness film and the ferrule is sufficiently low even if the dynamic friction coefficient between the high hardness film and the ferrule is not low because the high hardness film makes point contacts with the ferrule at multiple points. This contributes to low-cost manufacture.

I claim:
1. An optical module comprising an optical semiconductor element, a holder for holding said optical semiconductor element and a receptacle core, having a bore, the receptacle core being fixed to said holder for holding a ferrule of an optical plug being connected in a fixedly fitted manner, said optical semiconductor element being optically coupled with an optical fiber in said ferrule when said optical plug is connected to said optical module, characterized in that said receptacle core is an integrally formed metallic tubular piece having a high hardness film of TiC formed at least on the inner circumferential surface of the bore thereof, and a ferrule stopper is provided on the proximal end of said bore.

2. An optical module as set forth in claim 1 wherein the hardness of said TiC is 2800–3500 Hv in Vickers hardness.

3. An optical module as set forth in claim 2 wherein said holder has a lens therein.

4. An optical module as set forth in claim 1, 2 or 3 wherein said receptacle core is made of stainless steel.

5. An optical module comprising an optical semiconductor element, a holder for holding said optical semiconductor element and a receptacle core having a bore, said receptacle core being fixed to said holder for holding a ferrule of an optical plug being connected in a fixedly fitted manner, said optical semiconductor element being optically coupled with an optical fiber in said ferrule when said optical plug is connected to said optical module, characterized in that said holder and said receptacle core are a single integrally formed metallic piece having a high hardness film of TiC formed at least on the inner circumferential surface of the bore thereof and a ferrule stopper is provided in said bore.

6. An optical module as set forth in claim 5 wherein the hardness of said TiC is 2800–3500 $H_v$ in Vickers hardness.

7. An optical module as set forth in claim 6 wherein said holder has a lens therein.

8. An optical module as set forth in claim 5, 6 or 7 wherein said holder is made of stainless steel.

\* \* \* \* \*